(12) United States Patent
Nohara et al.

(10) Patent No.: US 9,482,338 B2
(45) Date of Patent: Nov. 1, 2016

(54) OIL PRESSURE CONTROL DEVICE FOR AUTOMATIC TRANSMISSION

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Hideharu Nohara, Toyota (JP); Toshio Sugimura, Nagoya (JP); Tooru Matsubara, Toyota (JP); Koichi Okuda, Toyota (JP); Kota Fujii, Toyota (JP); Kazuyuki Noda, Anjo (JP); Kousuke Tanaka, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 64 days.

(21) Appl. No.: 14/682,499

(22) Filed: Apr. 9, 2015

(65) Prior Publication Data
US 2015/0308568 A1 Oct. 29, 2015

(30) Foreign Application Priority Data
Apr. 25, 2014 (JP) ................. 2014-091760

(51) Int. Cl.
| | |
|---|---|
| *F16H 61/06* | (2006.01) |
| *F16H 61/28* | (2006.01) |
| *F16H 61/00* | (2006.01) |
| *F16H 61/30* | (2006.01) |
| *F16H 61/02* | (2006.01) |

(52) U.S. Cl.
CPC ...... *F16H 61/2807* (2013.01); *F16H 61/0025* (2013.01); *F16H 61/061* (2013.01); *F16H 61/30* (2013.01); *F16H 61/0206* (2013.01); *Y02T 10/7258* (2013.01)

(58) Field of Classification Search
CPC ........... F16H 61/0246; F16H 61/0272; F16H 61/08; F16H 61/061; F16H 61/0025; F16H 61/0206
See application file for complete search history.

(56) References Cited

U.S. PATENT DOCUMENTS

| | | | |
|---|---|---|---|
| 6,689,006 B2 * | 2/2004 | Kaizu ................. | F16H 61/0206 475/127 |
| 8,465,396 B2 * | 6/2013 | Iwamoto ............ | F16H 61/0437 475/118 |
| 2013/0260955 A1 | 10/2013 | Kimata et al. | |

FOREIGN PATENT DOCUMENTS

| | | |
|---|---|---|
| JP | H09-280357 A | 10/1997 |
| JP | 2000-205404 A | 7/2000 |
| JP | 2013-203295 A | 10/2013 |

* cited by examiner

*Primary Examiner* — Sherry Estremsky
(74) *Attorney, Agent, or Firm* — Oliff PLC

(57) ABSTRACT

When a user performs an operation to switch from a forward range to a reverse range, an ECU switches an oil passage (referred to hereafter as a "B2 pressure supply source oil passage"), through which oil pressure is supplied to a brake, from a first oil passage to a second oil passage while engaging the same brake. At this time, in consideration of a response delay in the oil pressure in the second oil passage, the ECU switches the B2 pressure supply source oil passage from the first oil passage to the second oil passage after a predetermined time α elapses from the point at which the user performs the forward-reverse switch operation (in other words, after waiting for the oil pressure in the second oil passage to reach a threshold pressure) rather than at the point at which the user performs the forward-reverse switch operation.

6 Claims, 8 Drawing Sheets

FIG.3

|  | C1 | C2 | B1 | B2 | F1 |
|---|---|---|---|---|---|
| 1st/Rev | ○ |  |  | ○ | ○ |
| 2nd | ○ |  | ○ |  |  |
| 3rd | ○ | ○ |  |  |  |
| 4th |  | ○ | ○ |  |  |
| N |  |  |  |  |  |

○ : ENGAGED

< COMPARATIVE EXAMPLE >

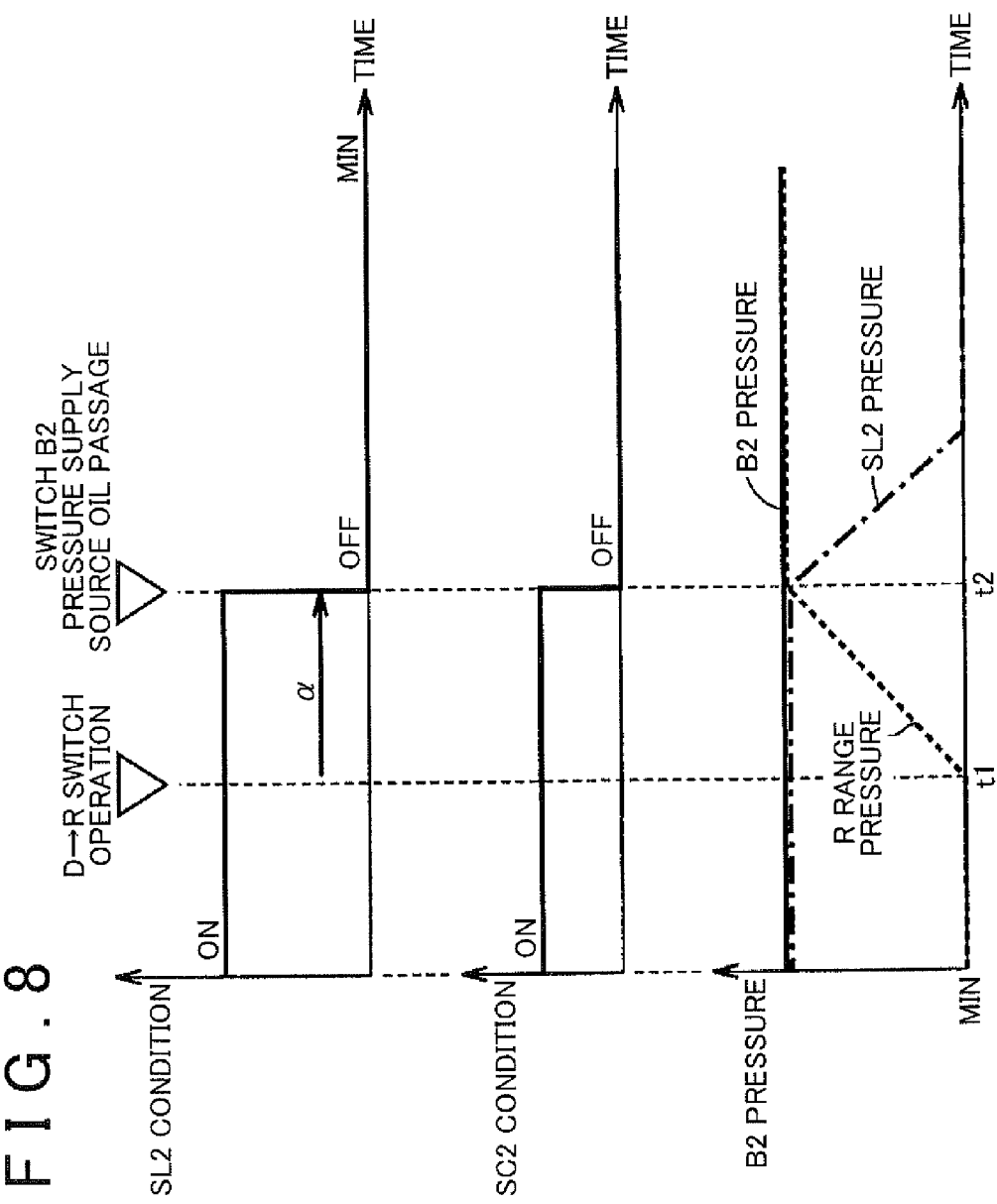

OIL PRESSURE CONTROL DEVICE FOR AUTOMATIC TRANSMISSION

INCORPORATION BY REFERENCE

The disclosure of Japanese Patent Application No. 2014-091760, filed on Apr. 25, 2014 including the specification, drawings and abstract, is incorporated herein by reference in its entirety.

BACKGROUND OF THE INVENTION

1. Field of the Invention

The invention relates to an oil pressure control device for an automatic transmission.

2. Description of Related Art

Japanese Patent Application Publication No. 2013-203295 (JP 2013-203295 A) discloses an automatic transmission that switches between a forward range and a reverse range by modifying an engaged friction engagement element.

In a vehicle that includes a motor as a drive source, it is possible to switch between forward and reverse travel by reversing a rotation direction of the motor. This type of vehicle may therefore be installed with an automatic transmission that switches between a forward range and a reverse range by switching an oil passage through which oil pressure is supplied to an engaged friction engagement element, using the same engaged friction engagement element.

SUMMARY OF THE INVENTION

In a vehicle installed with the automatic transmission described above, when the oil passage is switched as soon as a user performs an operation to switch between the forward range and the reverse range, the oil pressure of the friction engagement element decreases temporarily due to a response delay in the oil pressure in the switched oil passage, and as a result, shock may be generated.

The invention suppresses shock generated when an oil passage is switched in an automatic transmission in which a control condition is switched by switching an oil passage through which oil pressure is supplied to an engaged engagement element, using the same engaged engagement element.

In an oil pressure control device for an automatic transmission according to an aspect of the invention, the automatic transmission includes an engagement element configured to be engaged by application of oil pressure that is equal to or larger than a predetermined pressure in any case where a control condition of the automatic transmission is a first condition or a second condition, a first oil passage configured to supply the oil pressure to the engagement element when the control condition of the automatic transmission is the first condition, a second oil passage configured to supply the oil pressure to the engagement element when the control condition of the automatic transmission is the second condition, and a switch device configured to switch an oil passage, through which the oil pressure is supplied to the engagement element, between the first oil passage and the second oil passage. The oil pressure control device includes an electronic control unit (ECU) configured to switch the oil passage, through which the oil pressure is supplied to the engagement element, from the first oil passage to the second oil passage when a switch operation is performed to switch the control condition of the automatic transmission from the first condition to the second condition, on condition that the oil pressure in the second oil passage is equal to or larger than a threshold pressure corresponding to the predetermined pressure.

According to this configuration, when a user performs an operation to switch from the first condition (a forward range, for example) to the second condition (a reverse range, for example), the oil pressure control device switches the oil passage, through which the oil pressure is supplied to the engagement element, from the first oil passage to the second oil passage on condition that the oil pressure in the second oil passage equals or exceeds the threshold pressure corresponding to the predetermined pressure (either the predetermined pressure or a slightly lower oil pressure than the predetermined pressure at which shock is not generated). Hence, a temporary reduction in the oil pressure of the engagement element due to a response delay in the oil pressure in the second oil passage when the first oil passage is switched to the second oil passage is suppressed. As a result, shock caused by the oil passage switch is suppressed.

The automatic transmission may include an oil pressure source that supplies the oil pressure to the first oil passage and the second oil passage, and the ECU may be configured to start supplying the oil pressure from the oil pressure source to the second oil passage in response to the switch operation.

According to this configuration, supply of the oil pressure from the oil pressure source to the second oil passage is started in response to the switch operation, and it is therefore assumed that immediately after the switch operation, the oil pressure in the second oil passage has not yet reached the threshold pressure. In this configuration, the oil pressure control device switches the oil passage, through which the oil pressure is supplied to the engagement element, from the first oil passage to the second oil passage on condition that the oil pressure in the second oil passage has reached or exceeded the threshold pressure following the switch operation. In other words, when the switch operation is performed, the oil pressure control device keeps the first oil passage as the oil passage through which the oil pressure is supplied to the engagement element until the oil pressure in the second oil passage reaches the threshold pressure, and switches the oil passage, through which the oil pressure is supplied to the engagement element, to the second oil passage after the oil pressure in the second oil passage reaches the threshold pressure. As a result, the engagement element can be held in an engaged condition.

The ECU may be configured to switch the oil passage, through which the oil pressure is supplied to the engagement element, from the first oil passage to the second oil passage after the oil pressure in the second oil passage reaches the threshold pressure following the switch operation.

According to this configuration, in consideration of the response delay in the oil pressure in the second oil passage, the first oil passage is switched to the second oil passage after the oil pressure in the second oil passage reaches the threshold pressure rather than at the point where the user performs the switch operation. As a result, a temporary reduction in the oil pressure of the engagement element is suppressed appropriately.

The ECU may be configured to switch the oil passage, through which the oil pressure is supplied to the engagement element, from the first oil passage to the second oil passage when a predetermined time elapses following the switch operation.

According to this configuration, the oil passage, through which the oil pressure is supplied to the engagement element, can be switched from the first oil passage to the second oil passage without providing a sensor to measure the oil pressure in the second oil passage.

The first condition may correspond to a forward range in which a vehicle installed with the automatic transmission travels forward, the second condition may correspond to a reverse range in which the vehicle travels in a reverse direction, a drive source of the vehicle may include a motor, and the vehicle may be configured such that i) when the vehicle travels forward in the forward range, the motor rotates in a forward direction while the engagement element is engaged, and ii) when the vehicle travels in reverse in the reverse range, the motor rotates in the reverse direction while the engagement element is engaged.

According to this configuration, it is possible to switch between the forward range and the reverse range by reversing a rotation direction of the motor, using the same engaged engagement element.

The engagement element may be configured to fix a rotary member provided in an interior of the automatic transmission when the engagement element is engaged, and the automatic transmission may include a one-way clutch that is different element form the engagement element, and the one-way clutch allows the rotary member to rotate in one direction and prohibits the rotary member from rotating in another direction.

According to this configuration, the predetermined rotary member can be prevented from rotating in the other direction by the one-way clutch without engaging the engagement element.

According to the invention, it is possible to suppress shock generated when an oil passage is switched in an automatic transmission in which a control condition is switched by switching an oil passage through which oil pressure is supplied to an engaged engagement element, using the same engaged engagement element.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a view showing an engagement operation table of the automatic speed change unit;

FIG. 8 is a view showing oil pressure variation resulting from the control for switching the B2 pressure supply source oil passage.

DETAILED DESCRIPTION OF EMBODIMENTS

An embodiment of the invention will be described in detail below with reference to the drawings. Note that identical or corresponding parts of the drawings have been allocated identical reference symbols, and description thereof will not be repeated.

(Configuration of Vehicle)

Figure 1:
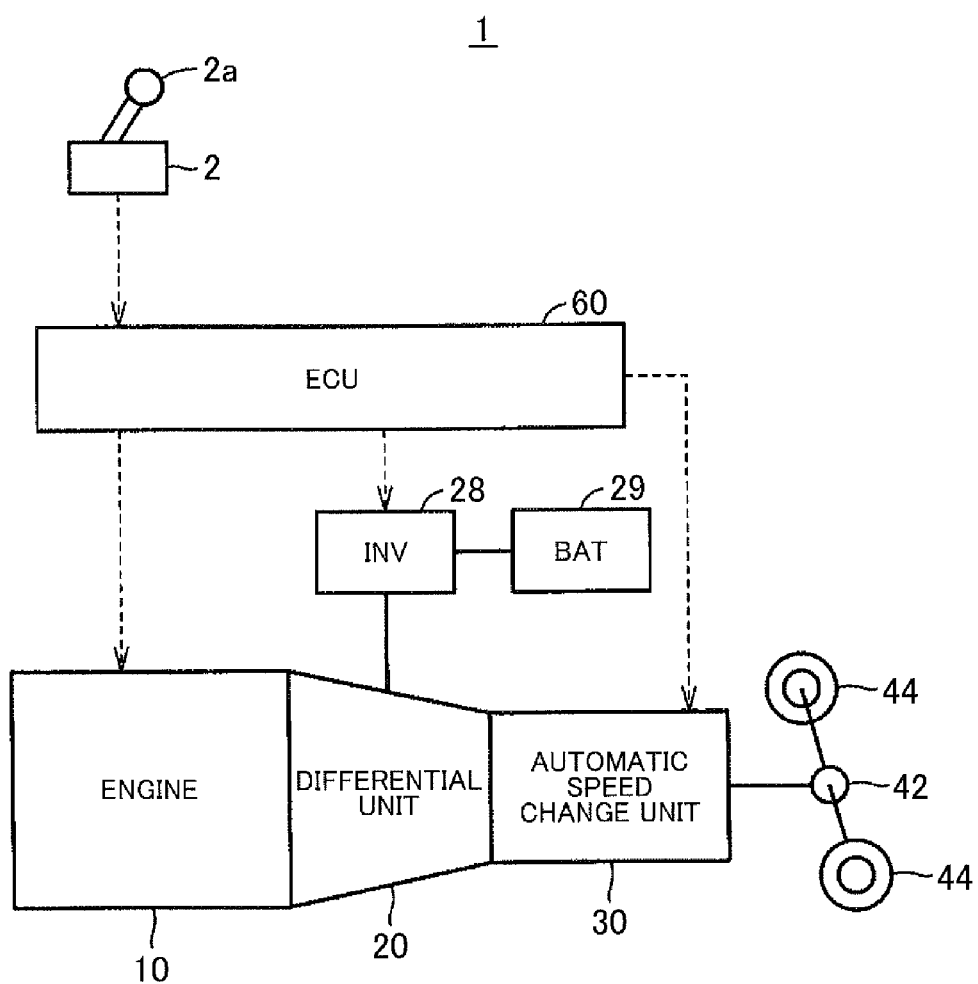
FIG. 1 is a view showing an overall configuration of a vehicle.

FIG. 1 is a view showing an overall configuration of a vehicle 1 according to this embodiment. The vehicle 1 includes an engine 10, a differential unit 20, an automatic speed change unit 30, a differential gear unit 42, and a drive wheel 44. The vehicle 1 also includes an inverter 28, a storage device 29, and an ECU 60.

The engine 10 is an internal combustion engine constituted by a gasoline engine, a diesel engine, or the like, for example.

The differential unit 20 is coupled to the engine 10. As will be described below, the differential unit 20 includes a motor-generator (MG) (see FIG. 2) that is driven by the inverter 28, and a power split device that distributes an output of the engine 10 between the automatic speed change unit 30 and the MG.

The automatic speed change unit 30 is coupled to the differential unit 20 and configured such that a speed ratio (a gear position), which is a ratio between a rotation speed of an input shaft thereof connected to the differential unit 20 and a rotation speed of an output shaft thereof connected to the differential gear unit 42, can be modified. Configurations of the differential unit 20 and the automatic speed change unit 30 will be described in detail below.

The differential gear unit 42 is coupled to the output shaft of the automatic speed change unit 30 in order to transmit power output from the automatic speed change unit 30 to the drive wheel 44.

The inverter 28 is electrically connected to the storage device 29, and drives the MG provided in the differential unit 20 on the basis of a control signal from the ECU 60.

The storage device 29 stores power required for travel, and supplies the stored power to the inverter 28. The storage device 29 is charged with power generated by the MG of the differential unit 20 and received from the inverter 28.

A shift sensor 2 is provided in the vehicle 1. The shift sensor 2 detects a position (referred to hereafter as a "shift position (SP)") of a shift lever 2a operated by a user, and transmits a detection result to the ECU 60. Note that the SP includes a D (forward) position, an R (reverse) position, an N (neutral) position, a P (parking) position, and so on.

Further, although not shown in the drawings, the vehicle 1 is provided with a plurality of sensors for detecting various physical quantities required to control the vehicle 1, such as an accelerator operation amount (an amount by which an accelerator pedal is operated by the user), a rotation speed of the engine 10, a vehicle speed V, and so on. The sensors transmit detection results to the ECU 60.

A central processing unit (CPU) and a memory, not shown in the drawings, are built into the ECU 60. The ECU 60 executes predetermined calculation processing on the basis of information from the respective sensors and information stored in the memory, and controls respective devices of the vehicle 1 on the basis of calculation results.

The ECU 60 modifies a control condition (also referred to as a "shift range" hereafter) of the automatic speed change unit 30 on the basis of the SP serving as the detection result of the shift sensor 2.

For example, when the SP is the D position, the ECU 60 sets the shift range at a "D range (a forward range)". In the D range, the automatic speed change unit 30 is controlled on the basis of a shift diagram (not shown) having the accelerator operation amount, the vehicle speed, and so on, for example, as parameters so that one of a first speed gear position to a fourth speed gear position in which forward travel is possible is formed.

Further, when the SP is the R position, the ECU 60 sets the shift range at an "R range (a reverse range)". In the R range, the automatic speed change unit 30 is controlled so that a reverse gear position in which reverse travel is possible is formed.

Furthermore, when the SP is the N position, the ECU 60 sets the shift range at an "N range". In the N range, the automatic speed change unit 30 is controlled to a neutral condition (a condition in which power is not transmitted).

Further, when the SP is the P position, the ECU 60 sets the shift range at a "P range". In the P range, the output shaft of the automatic speed change unit 30 is fixed.

(Configurations of Differential Unit and Automatic Speed Change Unit)

Figure 2:
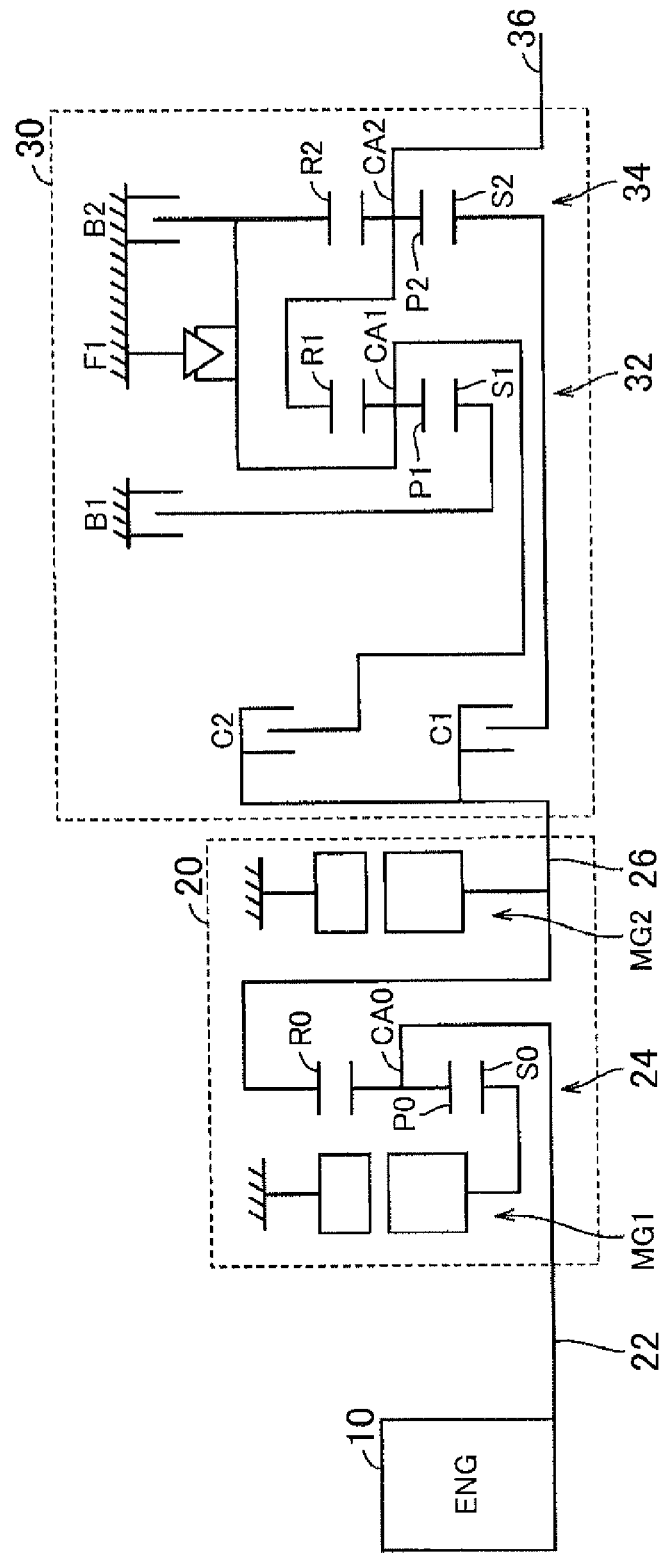
FIG. 2 is a view showing configurations of a differential unit and an automatic speed change unit.

FIG. 2 is a view showing the configurations of the differential unit 20 and the automatic speed change unit 30 shown in FIG. 1. Note that the differential unit 20 and the automatic speed change unit 30 are configured symmetrically about respective axial centers thereof, and in FIG. 2, therefore, respective lower sides of the differential unit 20 and the automatic speed change unit 30 have been omitted.

The differential unit 20 includes MG1, MG2, and a power split device 24. The MG1, MG2 are alternating current rotating electrical devices driven by the inverter 28 (FIG. 1).

The power split device 24 is constituted by a single pinion type planetary gear including a sun gear S0, a pinion gear P0, a carrier CA0, and a ring gear R0. The carrier CA0 is coupled to an input shaft 22, or in other words an output shaft of the engine 10, in order to support the pinion gear P0 to be capable of rotating and revolving. The sun gear S0 is coupled to a rotary shaft of the MG1. The ring gear R0 is coupled to a transmission member 26 and configured to mesh with the sun gear S0 via the pinion gear P0. A rotary shaft of the MG2 is coupled to the transmission member 26. In other words, the ring gear R0 is also coupled to the rotary shaft of the MG2.

Figure 4:
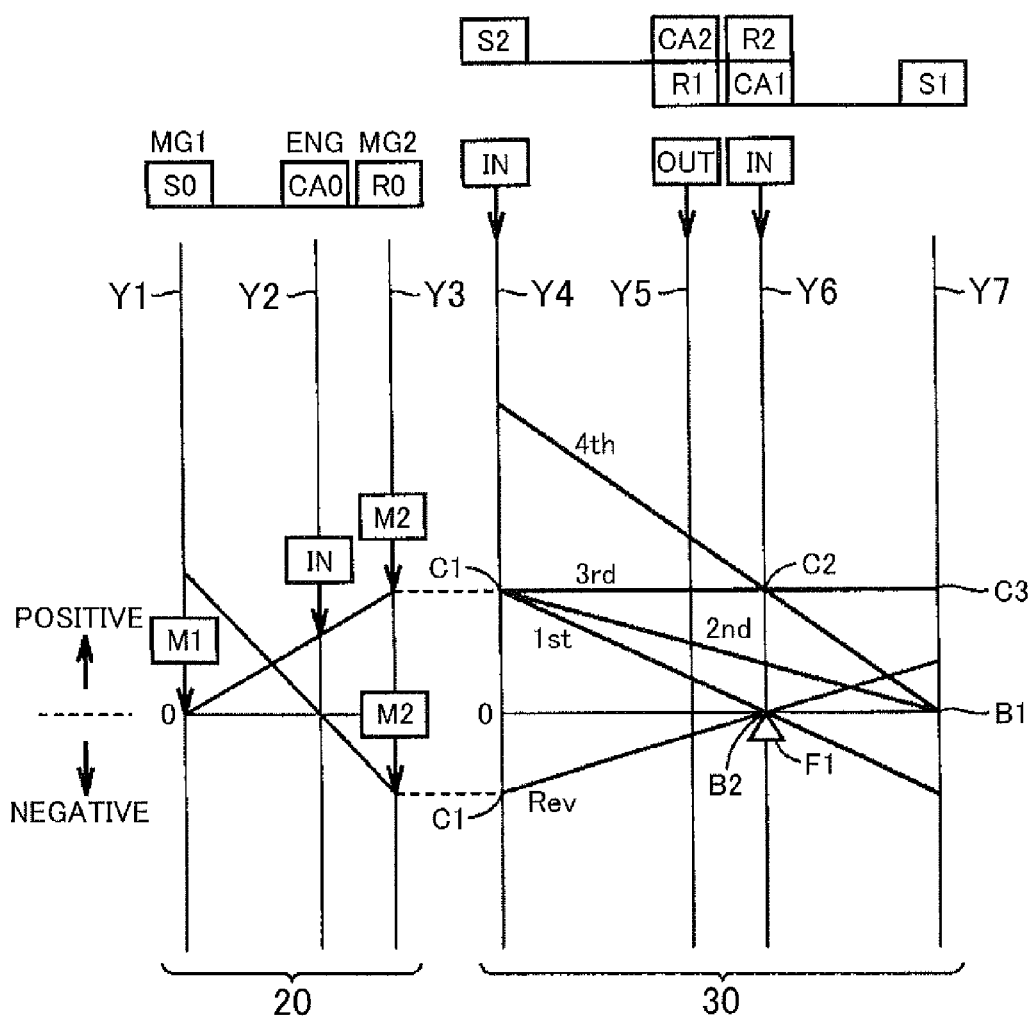
FIG. 4 is a collinear diagram of a speed change mechanism constituted by the differential unit and the automatic speed change unit.

When the sun gear S0, the carrier CA0, and the ring gear R0 rotate relative to each other, the power split device 24 functions as a differential device. Respective rotation speeds of the sun gear S0, the carrier CA0, and the ring gear R0 are related so as to be linked by a straight line on a collinear diagram, as will be described below (FIG. 4). Using the differential function of the power split device 24, power output from the engine 10 is distributed between the sun gear S0 and the ring gear R0. The MG1 is caused to operate as a power generator by the power distributed to the sun gear S0, and power generated by the MG1 is supplied to the MG2 and stored in the storage device 29 (FIG. 1).

The automatic speed change unit 30 includes single pinion type planetary gears 32, 34, clutches C1, C2, brakes B1, B2, and a one-way clutch F1. The planetary gear 32 includes a sun gear S1, a pinion gear P1, a carrier CA1, and a ring gear R1. The planetary gear 34 includes a sun gear S2, a pinion gear P2, a carrier CA2, and a ring gear R2.

The clutches C1, C2 and the brakes B1, B2 are respectively friction engagement elements operated by oil pressure. The respective friction engagement elements are constituted by multi-plate wet type elements in which a plurality of overlapped friction plates are pressed together by oil pressure, band brakes in which one end of a band wrapped around an outer peripheral surface of a rotating drum is tightened by oil pressure, and so on, for example.

The one-way clutch F1 supports the coupled carrier CA1 and ring gear R2 to be capable of rotating in a positive direction (a vehicle advancement direction) and incapable of rotating in a negative direction (a vehicle reverse direction).

The differential unit 20 and the automatic speed change unit 30 are coupled by the transmission member 26. An output shaft 36 coupled to the carrier CA2 of the planetary gear 34 is coupled to the differential gear unit 42 (FIG. 1).

Figure 3:
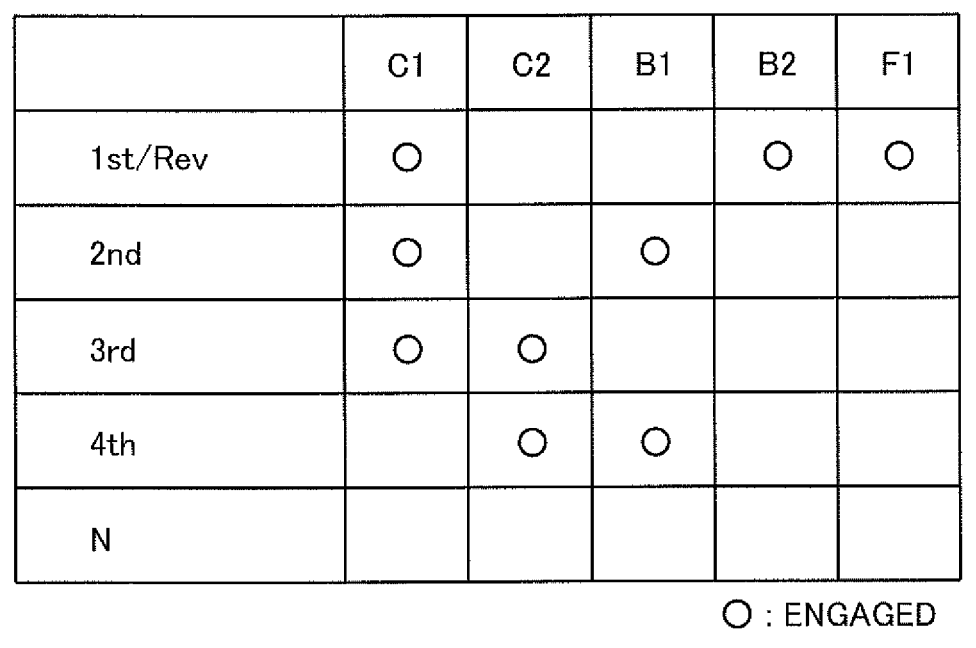

FIG. 3 is a view showing an engagement operation table of the automatic speed change unit 30. By engaging the clutches C1, C2, the brakes B1, B2, and the one-way clutch F1 in accordance with the engagement operation table shown in FIG. 3, the first to fourth speed gear positions (the forward gear positions) and the reverse gear position are formed. Note that in FIG. 3, circles indicate engaged conditions and blank sections indicate disengaged conditions. Further, "N" indicates the neutral condition.

For example, when the clutch C1 and the brake B2 are engaged and the other clutch and brake are disengaged, the first speed gear position (1st) and the reverse gear position (Rev) are formed. In other words, in the automatic speed change unit 30 according to this embodiment, identical friction engagement elements are used to form the first speed gear position in the D range and the reverse gear position in the R range. As a result, a friction engagement element and a solenoid valve used exclusively in the R range can be omitted, enabling a reduction in the size of the automatic speed change unit 30.

The vehicle 1 is switched between forward travel and reverse travel by reversing a rotation direction of the MG2. More specifically, the ECU 60 causes the vehicle 1 to advance in the first speed gear position by rotating the MG2 in the positive direction while engaging the clutch C1 and the brake B2, and causes the vehicle to reverse by rotating the MG2 in the negative direction while engaging the clutch C1 and the brake B2.

FIG. 4 is a collinear diagram of a speed change mechanism constituted by the differential unit 20 and the automatic speed change unit 30. Referring to both FIG. 2 and FIG. 4, a vertical line Y1 on a collinear diagram corresponding to the differential unit 20 indicates a rotation speed of the sun gear S0 of the power split device 24 (in other words, a rotation speed of the MG1). A vertical line Y2 indicates a rotation speed of the carrier CA0 of the power split device 24 (in other words, the rotation speed of the engine 10). A vertical line Y3 indicates a rotation speed of the ring gear R0 of the power split device 24 (in other words, a rotation speed of the MG2). Note that intervals between the vertical lines Y1 to Y3 are determined according to a gear ratio of the power split device 24.

Further, a vertical line Y4 on a collinear diagram corresponding to the automatic speed change unit 30 indicates a rotation speed of the sun gear S2 of the planetary gear 34. A vertical line Y5 indicates a rotation speed of the carrier CA2 of the planetary gear 34 and the ring gear R1 of the planetary gear 32, which are coupled to each other. A vertical line Y6 indicates a rotation speed of the ring gear R2 of the planetary gear 34 and the carrier CA1 of the planetary gear 32, which are coupled to each other. A vertical line Y7 indicates a rotation speed of the sun gear S1 of the planetary gear 32. Intervals between the vertical lines Y4 to Y7 are determined according to gear ratios of the planetary gears 32, 34.

When the clutch C1 is engaged, the sun gear S2 of the planetary gear 34 of the automatic speed change unit 30 is coupled to the ring gear R0 of the differential unit 20 such that the sun gear S2 rotates at an identical speed to the ring gear R0. When the clutch C1 is engaged, therefore, the vertical line Y4 indicating the rotation speed of the sun gear S2 serves as a rotation speed of the input shaft of the automatic speed change unit 30.

When the clutch C2 is engaged, on the other hand, the carrier CA1 of the planetary gear 32 and the ring gear R2 of the planetary gear 34 in the automatic speed change unit 30 are coupled to the ring gear R0 of the differential unit 20 such that the carrier CA1 and the ring gear R2 rotate at an identical speed to the ring gear R0. When the clutch C2 is engaged, therefore, the vertical line Y6 indicating the rotation speed of the carrier CA1 and the ring gear R2 serves as the rotation speed of the input shaft of the automatic speed change unit 30.

The vertical line Y5 indicating the rotation speed of the carrier CA2 of the planetary gear 34 corresponds to an output rotation speed of the automatic speed change unit 30 (the rotation speed of the output shaft 36).

When, for example, the second speed gear position (2nd) is formed by engaging the clutch C1 and the brake B1 and disengaging the other clutch and brake, as shown on the engagement operation table in FIG. 3, the collinear diagram of the automatic speed change unit 30 takes the form of a straight line indicated by "2nd".

Further, when the clutch C1 and the brake B2 are engaged and the other clutch and brake are disengaged, as shown on the engagement operation table in FIG. 3, the first speed gear position (1st) and the reverse gear position (Rev) are formed in accordance with the rotation condition of the MG2.

When the MG2 (the ring gear R0) rotates in the positive direction, the collinear diagram of the automatic speed change unit 30 takes the form of a straight line indicated by "1st". More specifically, when the clutch C1 is engaged, the sun gear S2 rotates in the positive direction together with the ring gear R0, and when the brake B2 is engaged, the ring gear R2 stops rotating, with the result that the output shaft 36 of the automatic speed change unit 30 rotates in the positive direction (the forward direction).

When the MG2 (the ring gear R0) rotates in the negative direction, on the other hand, the collinear diagram of the automatic speed change unit 30 takes the form of a straight line indicated by "Rev". More specifically, when the clutch C1 is engaged, the sun gear S2 rotates in the negative direction together with the ring gear R0, and when the brake B2 is engaged, the ring gear R2 stops rotating, with the result that the output shaft 36 of the automatic speed change unit 30 rotates in the negative direction (the reverse direction). Note that rotation of the ring gear R2 in the negative direction is also suppressed by the one-way clutch F1.

Hence, in the automatic speed change unit 30, the first to fourth speed gear positions, the reverse gear position, and the neutral condition can be formed by engaging and disengaging the clutches C1, C2 and the brakes B1, B2 in accordance with the engagement operation table of FIG. 3.

In the differential unit 20, meanwhile, continuously variable speed changing, in which the rotation speed of the ring gear R0, or in other words a rotation speed of the transmission member 26, can be modified continuously relative to a predetermined rotation speed of the engine 10 coupled to the carrier CA0, is realized by controlling the rotation of the MG1, MG2 appropriately.

(Hydraulic Circuit)

The automatic speed change unit 30 is provided with a hydraulic circuit for engaging and disengaging the clutches C1, C2 and the brakes B1, B2 in accordance with the engagement operation table of FIG. 3.

Figure 5:
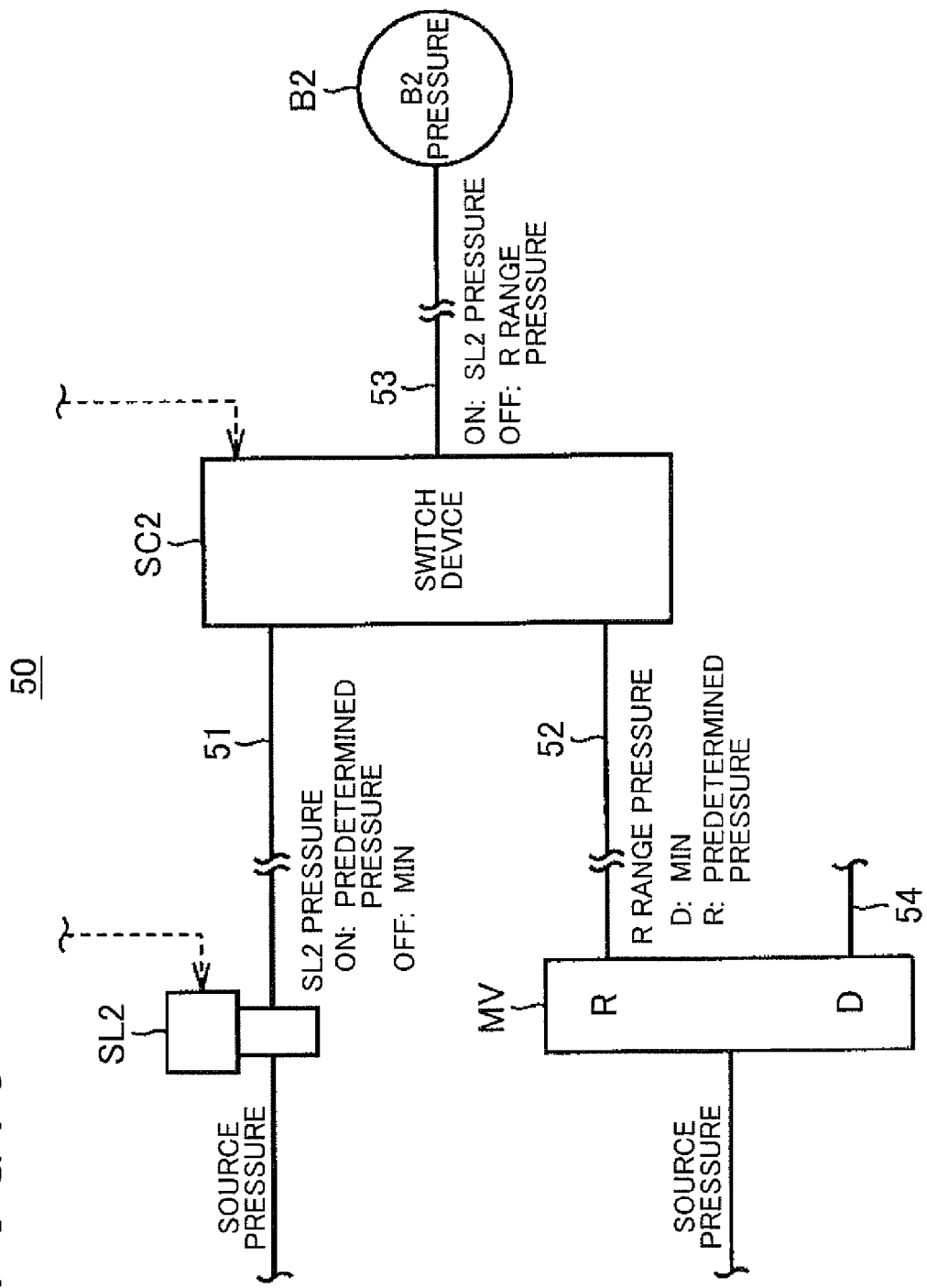
FIG. 5 is a schematic view showing a configuration of a hydraulic circuit that supplies oil pressure to a brake B2.

FIG. 5 is a schematic view showing a configuration of a hydraulic circuit 50 that supplies oil pressure to the brake B2.

The hydraulic circuit 50 includes a solenoid valve SL2, a manual valve MV, a switch device SC2, a first oil passage 51, a second oil passage 52, and a third oil passage 53. The brake B2 is engaged when the oil pressure (also referred to as a "B2 pressure" hereafter) supplied thereto from the hydraulic circuit 50 equals or exceeds a predetermined pressure.

The solenoid valve SL2 is controlled to either an ON condition or an OFF condition on the basis of a control signal from the ECU 60. When the solenoid valve SL2 is in the ON condition, the solenoid valve SL2 regulates a source pressure (a line pressure) supplied from an oil pressure source, not shown in the drawings, to the predetermined pressure, and outputs the predetermined pressure to the first oil passage 51.

When the solenoid valve SL2 is in the OFF condition, on the other hand, the solenoid valve SL2 regulates the source pressure to a minimum pressure MIN (zero, for example), and outputs the minimum pressure MIN to the first oil passage 51.

Hence, the oil pressure (also referred to as an "SL2 pressure" hereafter) in the first oil passage 51 is the predetermined pressure when the solenoid valve SL2 is in the ON condition, and the minimum pressure MIN when the solenoid valve SL2 is in the OFF condition. Note that the ECU 60 controls the solenoid valve SL2 to the ON condition when the SP is the D position. In the D range, therefore, the SL2 pressure corresponds to the predetermined pressure.

The manual valve MV is mechanically coupled to the shift lever 2a in order to switch a supply destination of the source pressure (the line pressure) supplied from the oil pressure source, not shown in the drawings, in accordance with the position (the SP) of the shift lever 2a. When the SP is the D position, the manual valve MV supplies the source pressure (the line pressure) to a different oil passage 54 to the second oil passage 52. When the SP is the R position, the manual valve MV supplies the source pressure to the second oil passage 52. By operating the manual valve MV in this manner, the oil pressure (also referred to as an "R range pressure" hereafter) in the second oil passage 52 falls to the minimum pressure MIN when the SP is the D position, and rises to the predetermined pressure when the SP is switched to the R position. In other words, supply of the oil pressure to the second oil passage 52 from the oil pressure source is started in response to an operation (also referred to as a "forward-reverse switch operation" hereafter) performed by the user to switch from the D range to the R range.

The switch device SC2 is an ON/OFF solenoid valve that is controlled to either an ON condition or an OFF condition on the basis of a control signal from the ECU 60. The switch device SC2 is connected to the first oil passage 51, the second oil passage 52, and the third oil passage 53. The switch device SC2 is connected to the brake B2 via the third oil passage 53.

The switch device SC2 is configured to be capable of switching an oil passage (also referred to as a "B2 pressure supply source oil passage" hereafter) through which the oil pressure is supplied to the brake B2 between the first oil passage 51 and the second oil passage 52. When the switch device SC2 is in the ON condition, the switch device SC2 supplies the SL2 pressure to the brake B2 by setting the first oil passage 51 as the B2 pressure supply source oil passage. When the switch device SC2 is in the OFF condition, on the other hand, the switch device SC2 supplies the R range pressure to the brake B2 by setting the second oil passage 52 as the B2 pressure supply source oil passage.

(Retreat Travel Upon Failure)

The hydraulic circuit of the automatic speed change unit 30 is configured such that when one of the solenoid valves in the hydraulic circuit breaks down (fails), the oil pressure (the SL2 pressure) in the first oil passage 51 is supplied to the clutch C2 in order to form the third speed gear position.

For example, when a failure occurs in the D range during forward travel in the first speed gear position, the supply destination of the SL2 pressure is modified from the brake B2 to the clutch C2. Accordingly, the brake B2 is disengaged and the clutch C2 is engaged by the SL2 pressure, whereby the third speed gear position is formed. As a result, retreat travel can be performed in the third speed gear position.

When the clutch C2 is engaged, however, the vehicle 1 can no longer reverse. More specifically, when the clutch C2 is engaged, the ring gear R0 of the differential unit 20 and the ring gear R2 of the automatic speed change unit 30 are coupled so as to rotate integrally, but rotation of the ring gear R2 in the reverse direction is suppressed by the one-way clutch F1. Hence, the ring gear R0 (the MG2) cannot rotate in the negative direction, and as a result, the vehicle 1 can no longer reverse.

It is therefore necessary to ensure that during a failure in the R range, the clutch C2 is not engaged even when the supply destination of the SL2 pressure is modified from the brake B2 to the clutch C2.

Hence, in this embodiment, when the user performs the forward-reverse switch operation described above (the operation to switch from the D range to the R range), the ECU 60 engages the brake B2 using the R range pressure by switching the B2 pressure supply source oil passage from the SL2 pressure to the R range pressure (in other words, by switching the switch device SC2 from the ON condition to the OFF condition). The ECU 60 then reduces the SL2 pressure from the predetermined pressure to zero (in other words, switches the solenoid valve SL2 from the ON condition to the OFF condition). Accordingly, the clutch C2 is not engaged during a failure even when the SL2 pressure is supplied to the clutch C2, and as a result, retreat travel can be performed while reversing.

(Control for Switching B2 Pressure Supply Source Oil Passage)

In this embodiment, as described above, the brake B2 is engaged both when the first speed gear position is formed in the D range and when the reverse gear position is formed in the R range, and to enable retreat travel while reversing, the B2 pressure supply source oil passage is switched between the D range and the R range.

However, when the B2 pressure supply source oil passage is switched as soon as the user performs the forward-reverse switch operation, shock may be generated.

Figure 6:
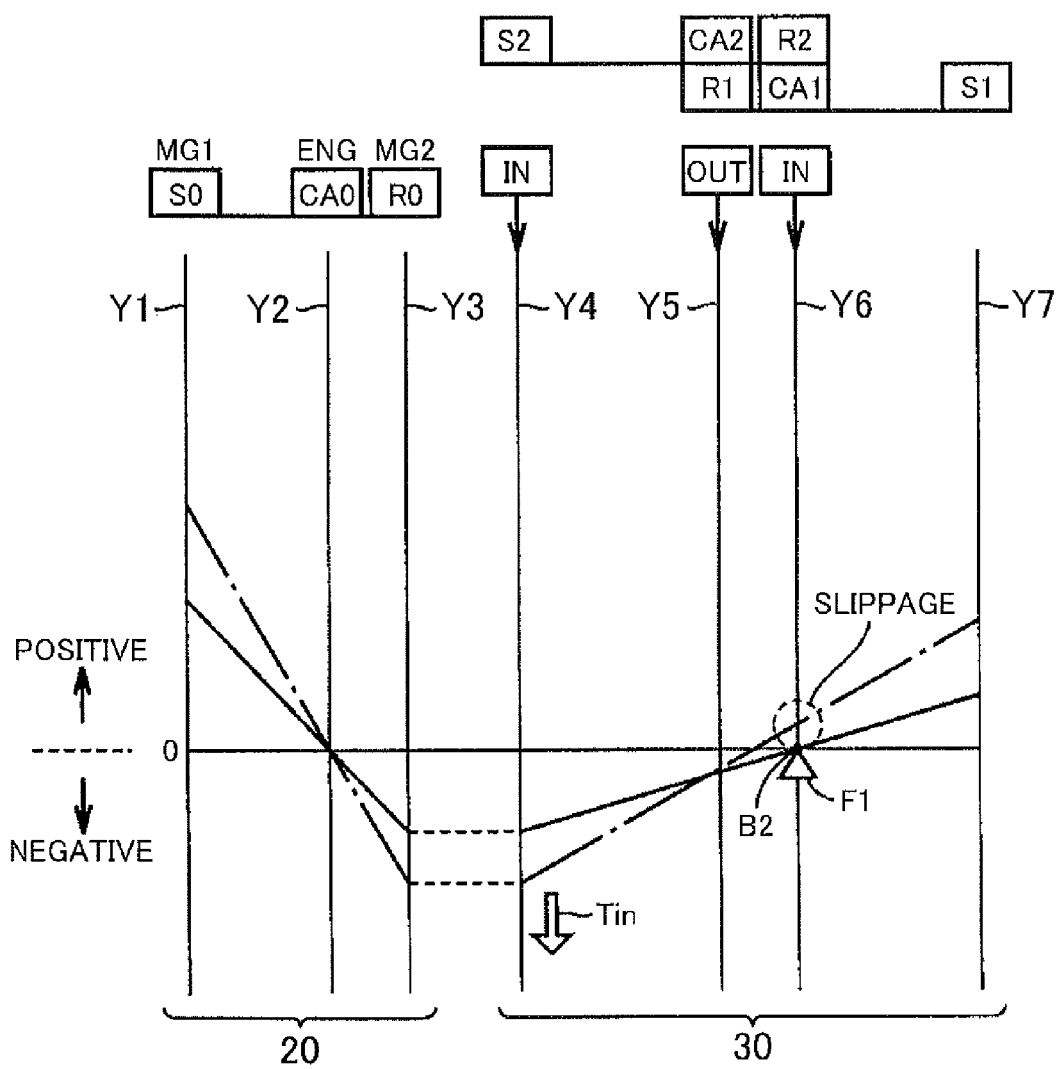
FIG. 6 is a view (a comparative example for comparison with the invention) illustrating a principle by which shock is generated.

FIG. 6 is a view (a comparative example for comparison with the invention) illustrating a principle by which shock is generated. When the forward-reverse switch operation is performed, the manual valve MV is operated, whereby the oil pressure (the R range pressure) in the second oil passage 52 is increased from the minimum pressure MIN to the predetermined pressure. Due to the effect of a response delay in the oil pressure, however, the R range pressure takes a small amount of time to increase to the predetermined pressure. Therefore, when the B2 pressure supply source oil passage is switched from the first oil passage 51 to the second oil passage 52 as soon as the forward-reverse switch operation is performed, the R range pressure, which has not yet reached the predetermined pressure, is supplied to the brake B2. Accordingly, the B2 pressure temporarily decreases such that the brake B2 slips in response to a reaction force to a torque Tin input into the sun gear S2 from the MG2, and as a result, the rotation speed of the ring gear R2 of the automatic speed change unit 30 increases (see dot-dash line).

When the R range pressure reaches the predetermined pressure thereafter, the brake B2 is re-engaged so that the rotation speed of the ring gear R2 of the automatic speed change unit 30 returns to zero. When a slippage amount of the brake B2 at this time is large, an amount of variation in the rotation speed of the ring gear R2 upon re-engagement of the brake B2 increases, and as a result, shock may be generated.

To suppress this shock, the ECU 60 according to this embodiment waits until the R range pressure reaches a "threshold pressure" following the forward-reverse switch operation, and then switches the B2 pressure supply source oil passage from the first oil passage 51 to the second oil passage 52 (in other words, the ECU 60 switches the B2 pressure supply source oil passage from the first oil passage 51 to the second oil passage 52 on condition that the oil pressure in the second oil passage 52 equals or exceeds the threshold pressure).

Here, the "threshold pressure" is set at an oil pressure at which the slippage amount of the brake B2 can be sufficiently suppressed to ensure that the shock described above is not generated. When the slippage amount of the brake B2 is to be reduced to zero, the threshold pressure may be set at a "predetermined pressure" at which the brake B2 is fully engaged. When the brake B2 is to be allowed to slip by a slight amount at which no shock is generated, the threshold pressure may be set at a slightly smaller value than the "predetermined pressure". In both cases, the threshold pressure is set at an oil pressure corresponding to the predetermined pressure (either the predetermined pressure or a slightly lower oil pressure than the predetermined pressure) so that as long as the oil pressure in the second oil passage 52 equals or exceeds the "threshold pressure", no shock is generated even when the B2 pressure supply source oil passage is switched from the first oil passage 51 to the second oil passage 52.

Figure 7:
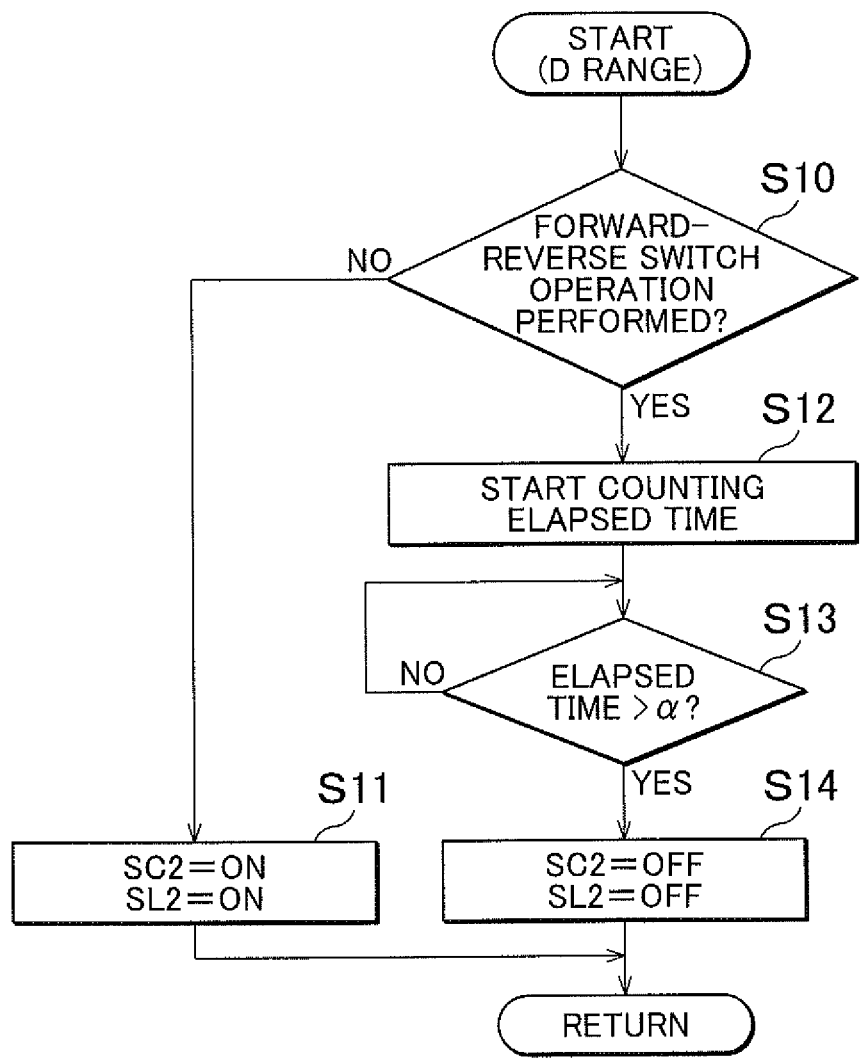
FIG. 7 is a flowchart showing a processing flow of control for switching a B2 pressure supply source oil passage.

FIG. 7 is a flowchart showing a processing flow of control performed by the ECU 60 to switch the B2 pressure supply source oil passage. This flowchart is executed repeatedly at predetermined period intervals in the D range.

In S10, the ECU 60 determines on the basis of the SP whether or not the forward-reverse switch operation (the operation for switching from the D range to the R range) has been performed.

When the forward-reverse switch operation has not been performed (NO in S10), the ECU 60 keeps the switch device SC2 in the ON condition (in other words, keeps the first oil passage 51 as the B2 pressure supply source oil passage) and keeps the solenoid valve SL2 in the ON condition (in other words, keeps the SL2 pressure at the predetermined pressure) in S11.

When the forward-reverse switch operation has been performed (YES in S10), or in other words when the manual valve MV has been operated in order to start supplying the source pressure from the oil pressure source to the second oil passage 52 so that the oil pressure (the R range pressure) in the second oil passage 52 starts to increase, the ECU 60 starts to count (measure) an elapsed time following an execution timing of the forward-reverse switch operation in S12.

In S13, the ECU 60 determines whether or not the elapsed time following the execution timing of the forward-reverse switch operation exceeds a predetermined time α. This determination corresponds to processing for determining whether or not the R range pressure has reached the threshold pressure described above on the basis of the elapsed time following the execution timing of the forward-reverse switch operation.

Here, the predetermined time α is set at a time required for the R range pressure to reach the threshold pressure following the execution timing of the forward-reverse switch operation. Note that the predetermined time α may be a fixed value determined in advance by experiment and the like, or a variable value that is modified in accordance with parameters (an oil temperature and so on, for example) that affect a rise response of the R range pressure. In either case, according to this embodiment, the determination as to whether or not the R range pressure has reached the threshold pressure can be made without providing a pressure sensor to measure the R range pressure.

When the elapsed time following the execution timing of the forward-reverse switch operation does not exceed the predetermined time α (NO in S13), the ECU 60 returns to the processing of S13.

When the elapsed time following the execution timing of the forward-reverse switch operation exceeds the predetermined time α (YES in S13), the ECU 60 determines that the R range pressure has reached the threshold pressure, and switches the switch device SC2 from the ON condition to the OFF condition. As a result, the B2 pressure supply source oil passage is switched from the first oil passage 51 to the second oil passage 52, whereby the R range pressure is supplied to the brake B2 instead of the SL2 pressure. Further, the ECU 60 switches the solenoid valve SL2 from the ON condition to the OFF condition. As a result, the SL2 pressure is reduced to the minimum pressure MIN.

FIG. 8 is a view showing oil pressure variation resulting from the control for switching the B2 pressure supply source oil passage. Note that FIG. 8 shows a case in which the threshold pressure is set at the "predetermined pressure".

At a time t1 when the forward-reverse switch operation is performed, the manual valve MV is operated in order to start supplying the source pressure from the oil pressure source to the second oil passage 52. Accordingly, the oil pressure (the R range pressure) in the second oil passage 52 gradually increases from the minimum pressure MIN.

Before a time t2 at which the predetermined time α following the execution timing of the forward-reverse switch operation elapses, the R range pressure has not yet reached the predetermined pressure (the threshold pressure), and therefore the switch device SC2 is kept in the ON condition. In other words, the B2 pressure supply source oil passage is maintained at the SL2 pressure.

At the time t2 when the predetermined time α elapses, the R range pressure has reached the predetermined pressure (the threshold pressure), and therefore the switch device SC2 is switched from the ON condition to the OFF condition. Accordingly, the B2 pressure supply source oil passage is switched from the SL2 pressure to the R range pressure. As a result, the B2 pressure is maintained at the predetermined pressure without decreasing.

Furthermore, the solenoid valve SL2 is switched from the ON condition to the OFF condition. Accordingly, the SL2 pressure decreases to the minimum pressure MIN. The clutch C2 is not engaged thereafter even when a failure occurs such that the SL2 pressure is supplied to the clutch C2, and therefore retreat travel can be performed while reversing.

In this embodiment, as described above, when the user performs the forward-reverse switch operation, the ECU 60 switches the B2 pressure supply source oil passage from the first oil passage 51 to the second oil passage 52. At this time, in consideration of the response delay in the oil pressure in the second oil passage, the ECU 60 switches the B2 pressure supply source oil passage from the first oil passage 51 to the second oil passage 52 after the predetermined time α elapses from the point at which the user performs the forward-reverse switch operation (in other words, after waiting for the oil pressure in the second oil passage 52 to reach the threshold pressure) rather than at the point at which the user performs the forward-reverse switch operation (in other words, the point at which the manual valve MV is operated in order to start supplying the source pressure from the oil pressure source to the second oil passage 52). Therefore, a temporary reduction in the B2 pressure occurring due to the response delay in the oil pressure in the second oil passage 52 when the B2 pressure supply source oil passage is switched from the first oil passage 51 to the second oil passage 52 is appropriately suppressed. As a result, shock caused by switching the B2 pressure supply source oil passage is suppressed.

Modified Examples

Note that this embodiment may be modified as follows, for example.

(1) In this embodiment, a case in which the B2 pressure supply source oil passage is switched from the first oil passage 51 to the second oil passage 52 after waiting for the oil pressure (the R range pressure) in the second oil passage 52 to reach the threshold pressure was described, but as long as the B2 pressure can be held at or above the threshold pressure, the manner in which the B2 pressure supply source oil passage is switched is not limited thereto.

For example, a solenoid valve that is capable of regulating the R range pressure on the basis of a control signal from the ECU 60 may be provided in place of the manual valve MV that is operated in response to an operation of the shift lever 2a by the user, and the R range pressure may be raised in order to switch the B2 pressure supply source oil passage from the first oil passage 51 to the second oil passage 52 as soon as the forward-reverse switch operation is performed.

Further, instead of configuring the switch device SC2 to output one of the SL2 pressure and the R range pressure selectively, the switch device SC2 may be configured to be capable of adjusting an output proportion of the SL2 pressure and an output proportion of the R range pressure on the basis of a control signal from the ECU 60 so that the output proportion of the SL2 pressure is gradually reduced in accordance with increases in the output proportion of the R range pressure.

(2) In this embodiment, a case in which a switch from the D range to the R range is used as an example of a switch in the control condition of the automatic transmission was described, but the invention is not limited to this case, and may be applied to another case.

For example, the invention may be applied as required to a case in which the shift range is switched from the N range to the R range. The invention may also be applied as required to a case in which the gear position (the speed ratio) is switched instead of the shift range.

(3) In this embodiment, a case in which the solenoid valve SL2 is an ON/OFF valve was described, but the solenoid valve SL2 may be a pressure regulating valve that is capable of regulating an output oil pressure on the basis of a control signal from the ECU 60.

(4) In this embodiment, a case in which the invention is applied to a so-called split type hybrid vehicle having the engine and the MG1, MG2 as drive sources was described, but the vehicle to which the invention can be applied is not limited to the vehicle described in this embodiment. For example, the invention may be applied to a typical series type or parallel type hybrid vehicle having an engine and a single MG. The invention may also be applied to an electric vehicle having only a MG.

The embodiment disclosed herein is in all respects exemplary, and is not to be considered limiting. The scope of the invention is defined by the claims rather than the above description, and is intended to include all modifications having equivalent meanings and within the scope of the claims.

What is claimed is:

1. An oil pressure control device for an automatic transmission, the automatic transmission including
    an engagement element configured to be engaged by application of oil pressure that is equal to or larger than a predetermined pressure in any case where a control condition of the automatic transmission is a first condition or a second condition,
    a first oil passage configured to supply the oil pressure to the engagement element when the control condition of the automatic transmission is the first condition,
    a second oil passage configured to supply the oil pressure to the engagement element when the control condition of the automatic transmission is the second condition, and
    a switch device configured to switch an oil passage, through which the oil pressure is supplied to the engagement element, between the first oil passage and the second oil passage,
    the oil pressure control device comprising
    an electronic control unit configured to switch the oil passage from the first oil passage to the second oil passage when a switch operation is performed to switch the control condition of the automatic transmission from the first condition to the second condition, on condition that the oil pressure in the second oil passage is equal to or larger than a threshold pressure corresponding to the predetermined pressure.

2. The oil pressure control device according to claim 1, wherein
    the automatic transmission includes an oil pressure source that supplies the oil pressure to the first oil passage and the second oil passage, and
    the electronic control unit is configured to start supplying the oil pressure from the oil pressure source to the second oil passage in response to the switch operation.

3. The oil pressure control device according to claim 1, wherein the electronic control unit is configured to switch the oil passage from the first oil passage to the second oil passage after the oil pressure in the second oil passage reaches the threshold pressure following the switch operation.

4. The oil pressure control device according to claim 1, wherein the electronic control unit is configured to switch the oil passage from the first oil passage to the second oil passage when a predetermined time elapses following the switch operation.

5. The oil pressure control device according to claim 1, wherein
    the first condition corresponds to a forward range in which a vehicle installed with the automatic transmission travels forward,
    the second condition corresponds to a reverse range in which the vehicle travels in a reverse direction,
    a drive source of the vehicle includes a motor, and
    the vehicle is configured such that
    i) when the vehicle travels forward in the forward range, the motor rotates in a forward direction while the engagement element is engaged, and
    ii) when the vehicle travels in reverse in the reverse range, the motor rotates in the reverse direction while the engagement element is engaged.

6. The oil pressure control device according to claim 1, wherein
    the engagement element is configured to fix a rotary member provided in an interior of the automatic transmission when the engagement element is engaged, and
    the automatic transmission includes a one-way clutch that is different element from the engagement element, and the one-way clutch allows the rotary member to rotate in one direction and prohibits the rotary member from rotating in another direction.

* * * * *